(12) United States Patent
Remillard et al.

(10) Patent No.: US 6,591,598 B2
(45) Date of Patent: Jul. 15, 2003

(54) CROP HARVESTING HEADER WITH CAM CONTROLLED MOVEMENT OF THE REEL FINGERS

(75) Inventors: Rheal G. Remillard, St. Joseph (CA); Geoffrey U. Snider, Winnipeg (CA)

(73) Assignee: MacDon Industries Ltd., Winnipeg (CA)

(*) Notice: Subject to any disclaimer, the term of this patent is extended or adjusted under 35 U.S.C. 154(b) by 8 days.

(21) Appl. No.: 10/068,310

(22) Filed: Feb. 8, 2002

(65) Prior Publication Data

US 2003/0061794 A1 Apr. 3, 2003

Related U.S. Application Data

(60) Provisional application No. 60/325,544, filed on Oct. 1, 2001.

(51) Int. Cl.[7] .............................................. A01D 57/03
(52) U.S. Cl. ........................................ 56/226; 56/221
(58) Field of Search ....................... 56/219, 220, 221, 56/222, 223, 224, 225, 226, 227, 364, 120, 130

(56) References Cited

U.S. PATENT DOCUMENTS

| | | | | |
|---|---|---|---|---|
| 3,472,008 A | * | 10/1969 | Hurlburt ..................... | 56/226 |
| 4,067,177 A | * | 1/1978 | Tout ............................ | 56/226 |
| 4,156,340 A | * | 5/1979 | Colgan et al. ................ | 56/227 |
| 4,751,809 A | | 6/1988 | Fox et al. | |
| 4,936,082 A | * | 6/1990 | Majkrzak ..................... | 56/220 |
| 5,007,235 A | * | 4/1991 | Nickel et al. ................. | 56/220 |
| 5,768,870 A | * | 6/1998 | Talbot et al. ................. | 56/364 |
| 6,044,636 A | * | 4/2000 | Minnaert ..................... | 56/220 |
| 6,170,244 B1 | | 1/2001 | Coers et al. | |
| 6,195,972 B1 | * | 3/2001 | Talbot et al. ................. | 56/364 |
| 6,453,655 B2 | * | 9/2002 | Ferraris ....................... | 56/220 |
| 6,502,379 B1 | * | 1/2003 | Snider ......................... | 56/221 |

FOREIGN PATENT DOCUMENTS

CA   2238164   12/1998

OTHER PUBLICATIONS

MacDon Brochure (24 pages).

* cited by examiner

Primary Examiner—Robert E. Pezzuto
Assistant Examiner—Nathan Mammen
(74) Attorney, Agent, or Firm—Adrian D. Battison; Michael R. Williams; Ryan W. Dupuis

(57) ABSTRACT

A crop harvesting header includes a cutter bar arranged across a forward edge of a header frame structure, a draper or auger transport arrangement for transporting the cut crop for further processing, and a reel mounted on reel arms for controlling movement of the crop in the area over the cutter bar with the reel having a plurality of reel bats at spaced positions around the reel axis each reel bat having reel fingers projecting generally radially outwardly from the reel axis, the reel bats all lying on a common bat circle around the reel axis so that rotation of the reel causes the reel bats to follow a path of movement lying on the bat circle. A non-circular stationary cam track surrounds the reel axis within the bat circle so that the end most fingers of the bats are located in line with the cam and immediately adjacent the end sheet. Each bat is pivoted by a crank attached to the bat and a control link having one end freely pivotally connected to the outer end of the bat lever and having a cam follower the other end. A pulling link communicates rotation of the reel to the control link such that the cam follower thereof is caused to move along the cam track at a predetermined position therein. The crank is adjustable relative to the control link to change bat finger angle to provide a change in crop lift before the cutter bar while maintaining finger pattern. The cam location is adjustable around the reel axis to change the finger pattern.

30 Claims, 6 Drawing Sheets

SECTION A-A

CROP HARVESTING HEADER WITH CAM CONTROLLED MOVEMENT OF THE REEL FINGERS

This application claims the benefit of provisional application Ser. No. 60/325,544 filed Oct. 1, 2001.

This invention relates to a crop harvesting header including a cutter bar and a reel for controlling movement of the crop in the area over the cutter bar. The reel is rotatable about an axis generally parallel to the cutter bar and has a plurality of reel bats each having reel fingers projecting generally radially outwardly from the reel axis. The reel bats are pivotal each about a respective bat axis parallel to the reel axis so as to vary the angle of the fingers about the bat axis as the reel rotates. The reel co-operates with a cam carried on the header in generally stationary position so that each bat has a crank arm with a cam follower on the crank arm which follows the cam as the reel rotates and causes the required pivotal movement of the bat.

BACKGROUND OF THE INVENTION

Attention is directed to co-pending application Ser. No. 09/973,469 filed Oct. 10, 2001 and assigned to the same assignees which discloses a header using some of the features as set forth herein, the disclosure of which is incorporated herein by reference.

Some headers of the above type include a reel which has the reel axis fixed relative to the header and particularly the cutter bar. Many of these headers include a cam which is fixed on the end frame of the header and is shaped in a complex non-circular pattern so that the fingers follow a complex non-cylindrical path.

Other headers of this type include a reel which is mounted on reel arms which can raise and lower the reel relative to the cutter bar to provide different conditions for different crops.

The present invention is concerned with headers-including a reel both of the type in which the reel is fixed relative to the cutter bar and of the type in which the reel is mounted on arms which allow the reel to raise and lower relative to the cutter bar.

In the arrangement using a fixed reel carried on a transverse reel shaft, the mounting of the cam also in fixed position on the end frame of the header can be relatively easily obtained. One example is shown in the Macdon Model 912 which provides a cam disk bolted to the end frame. The cam disk provides a receptacle for a cylindrical bearing which supports the reel shaft and holds the reel shaft at a fixed position on the cam disk while allowing some twisting of the shaft in the bearing relative to the disk to accommodate any twisting of the frame of the header which could misalign the shaft. The disk is mounted on the end frame so that it can be rotated about the axis of the shaft to turn the whole finger pattern about the axis of the reel. This arrangement is however unsuitable for the movable type reel mounted on arms.

In U.S. Pat. No. 4,751,809 (Fox et al) assigned to the present applicant is disclosed an arrangement for a movable type reel carried on raisable reel arms in which the movement of the bats is controlled by a rotating ring carried by the reel on the same reel arms but rotating about an axis off-set from the reel axis. In this arrangement, the ring is smaller than the circle described by the assembly of rock shafts otherwise known herein as "bats" and the "bat circle". The ring shown in this patent and in other similar arrangements manufactured by other companies however do not allow any change in the finger tip pattern. The pattern is circular in nature and the rotation of the cam only results in rotating this circular path about the reel center. It is therefore impossible to improve the finger path in either one of the finger path zones. (Crop entry zone, crop lift zone, crop delivery zone, and crop release zone).

The only way to customise or optimise these finger path zones is to use a non-circular cam track where the links from the bats which effect the pivotal action are attached to followers which run in or on the cam track.

In U.S. Pat. No. 6,170,244 (Coers et al) assigned to Deere and Company and in Canadian Application 2,289,164 also by the same inventor is disclosed an arrangement in which the reel is mounted on reel arms and there is provided a cam which is carried also on the reel arms so that it raises and lowers with the reel but it is held at a position so that it does not rotate with the reel and controls the angle of the bats by crank arms and cam followers travelling on the cam.

In this arrangement, the cam track is as large or larger than the reel body and to the end of the finger controlling crank is attached a cam follower bearing which follows in the cam track. The downfall of this style of track is that the track has to co-exist laterally in the same area as the finger rock shaft path (shown on FIG. 3 of the patent) or "bat circle". This causes the endmost finger on the rock shaft, next to the end panel or end sheet to be located at some considerable distance inboard from the said panel causing severe performance problems related to clearing the cutter-bar from crop accumulations in this area. This poor clearing of the cutter-bar causes severe crop loss and poor header performance therefore resulting in lost productivity and profit.

In addition, several attempts have been made in the past to improve the reel performance by adjusting the cam track relative to the reel in a vertical or horizontal fashion. The conventional vertical and horizontal movement of the cam relative to the center reel body changes the finger tip path to improve crop lifting abilities. However it will often cause negative effects in an other area of the finger tip path.

Coers in the above patent makes an attempt to adjust the finger tip path by replacing cam track sections to customize the reel finger tip path to crop conditions. This invention is not practical as the customer has to make time consuming changes and carry an unreasonable amount of varying shapes of cam segments for each crop.

Also adjustment of the pattern by the rotation of the cam of Coers relative to the reel can be made similarly to the rotation of the cam in the above fixed reel type but in Coers the adjustment is made about an axis offset from the cam axis and this has other effects on the pattern which can be disadvantageous.

SUMMARY OF THE INVENTION

It is one object of the present invention to provide an improved harvester of the above general type in which the arrangement of the non-circular cam is improved to allow improved placement of the endmost finger.

According to a first aspect, therefore, the cam that controls the finger tip path has been made smaller than other previous designs. Its outside envelope is smaller than a circle depicted by an arc going through each finger rock shaft. This cam allows the finger rock shafts to extend closer to the end panel in order to remove crop from the corner formed by the end panel and the cutter bar which results in a higher header performance, lower crop loss.

The cam shown and described hereinafter has six rock shafts but the invention is not limited to that number. The maximum quantity of rock shafts would be limited by the amount of space required for the linkage. The cam shown depicts a control link that leads the finger rock shaft but the invention is not limited to such. This cam design can work with a rock shaft control link leading or trailing the rock shaft. The arrangement shows a possible linkage to locate the control link but is not limited to such. A various different linkages could be devised to accomplish any variation of the above. While the reel and cam shown can be made to be moved hydraulically fore and aft along the length of the reel support arms with cylinders or other, it is not necessary for this invention.

It is a further object of the present invention to provide an improved harvester of the above general type which allows an improved adjustment of the finger pattern.

According to a second aspect of the invention the cam that has the ability of being rotated on the same center and axis as the reel center tube which results in being able to adjust the finger pattern relative to the header cutter bar without compromising on an optimum finger tip pattern and maintaining a proper engagement of the follower to the track. Previous designs have relied on end panel locations to cam roller alignment because the cam has historically been mounted to end panels. This cam design when mounted on reel support arms needs to follow the axle of the reel as the reel may go out of square with the panels or frame. The pattern can thus be rotated for different crop conditions, that is standing or lodged, on the go without stopping while still providing optimum crop delivery to the canvas on a draper header or auger on an auger platform without affecting the optimum finger tip pattern that has been developed for a particular header (auger or draper platform). This results in higher productivity due to not having to stop for cam adjustments for varying crop conditions, or to replace cam segments. The cam can be adjusted infinitely with a cylinder, electric linear actuator, or, manually through a range of predetermined increments.

It is another object of the present invention to provide an improved harvester of the above general type allowing an improved adjustment of the finger action.

According to a third aspect, an adjustable crank is provided where the included angle of the finger and the control link can be infinitely adjustable or adjustable in increments to provide more or less crop lifting before the cutter bar for different crop conditions without affecting the overall shape of the finger tip path or pattern. The adjustability of the crank to finger angle as shown has slots to infinitely adjust the angle within a predetermined practical range. The invention is however not restricted to a slotted range and could be done in a number of ways including multiple positions. This is also better that moving the cam location relative to the reel center tube as the optimized finger tip pattern is not compromised, since delivery over the draper and or the auger pan is not compromised and crop entry and lift are also maintained at an optimum shape.

It is a further object of the present invention to provide a mounting arrangement for the reel relative to the cam member which ensures that the reel and cam track remain so that the cam track lies in a radial plane of the reel axis while providing an improved mounting of the reel.

According to a fourth aspect of the invention the reel includes at each end a reel support shaft portion lying on the reel axis for supporting the reel for rotation about the reel axis; the cam member includes a reel support member defining a longitudinal support axis with bearings supporting one reel support shaft portion at one end of the reel such that the bearings hold and maintain the shaft portion and the reel axis accurately coaxially With the support axis; the cam member is arranged to hold and maintain the cam track accurately in a radial plane of the support axis so as to hold the cam track in a radial plane of the reel axis; and the cam member is mounted relative to the header frame structure for rotational adjustment movement of the stationary angular location thereof around the longitudinal axis and therefore the reel axis.

The term "bat" as used herein is intended to be synonymous with the term "rock shaft" or "tine tube" as used herein as all terms are intended to merely refer to the elements on which the reel "fingers" or "tines" are mounted for pivotal movement about a longitudinal axis of the "bat" or "rock shaft" or "tine tube" without implying that the element is necessarily a shaft or implying that the element is non-circular in cross section.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
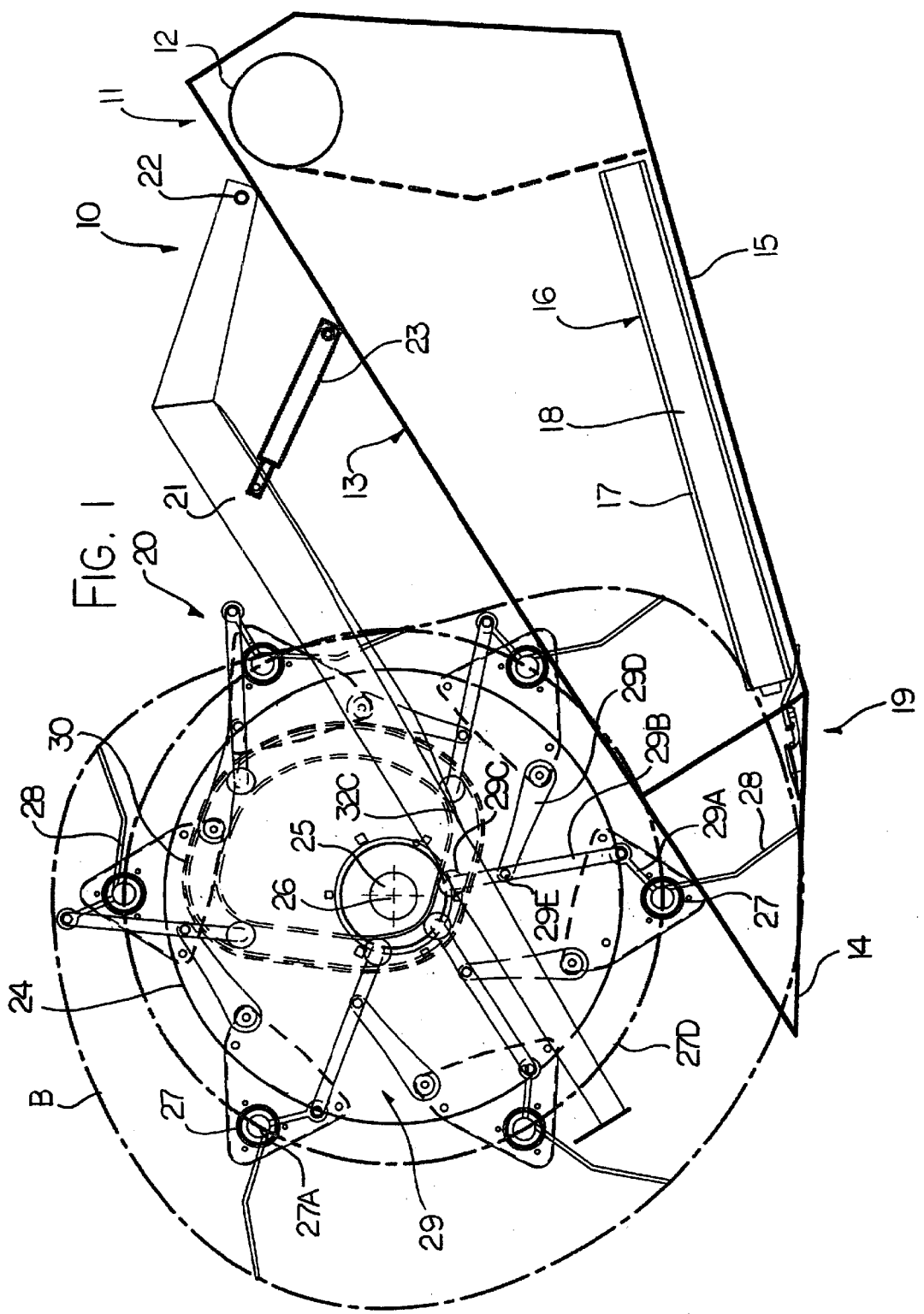
FIG. 1 is a schematic view of a header according to the present invention looking along the header toward one end and showing the reel, reel support arms, tine tubes, table, header frame, frame end sheet, cam and control linkages, with the end mounting disks of the reel omitted for convenience of illustration.

In FIG. 1 is shown an embodiment of a header according to the present invention with a number of the elements being shown schematically since the general construction of such headers is well known to one skilled in the art. The header 10 includes a header frame 11 having a main frame tube 12 extending across the width of the header between two end frames one of which is shown at 13 and the other of which is of course at the other end and therefore not visible in the elevation of FIG. 1. The main tube 12 is suitably supported and attached on a propulsion vehicle in a manner so that the header frame can be moved forwardly across the ground in cutting a standing crop. The end frame 13 extends forwardly from the main tube 12 to a forward nose section 14. The main tube 12 carries a plurality of frame bars which extend downwardly and forwardly for supporting a table 15 of the header onto which crop material is deposited after cutting. The structural elements defining the frame bars on the table are not shown for convenience of illustration since again these are well known to one skilled in the art and can vary in accordance with engineering considerations.

On the table 15 is provided a crop conveyor 16 which is arranged to transport the crop after cutting across the width of a header to a discharge location. In the embodiment shown the conveyor is provided as a draper canvas 17 mounted on rollers 18. Other embodiments can use alternative crop transportation systems and primarily an auger which is commonly used as an alternative for the draper system. The embodiments of the present invention are not limited to either of the different types of header.

At the front of the table 15 is provided a cutter bar generally indicated at 19 which is again only shown schematically since the construction of this is well known to one skilled in the art. The cutter bar shown provides a sickle knife in guards which reciprocates back and forth in a cutting action on the standing crop so that the crop is deposited on the draper for transportation to the discharge location.

When used on a combine harvester the discharge location is associated with a crop transfer system which transfers the crop rearwardly into the feeder house of the combine. Headers of this type can of course also be used as a swather where the discharge location simply discharges the crop onto the ground in a swath or through a crop conditioner onto the ground.

The header further includes a reel generally indicated at 20. The reel 20 includes mounting arms 21 pivoted on a suitable mounting 22 adjacent the tube 12 so that the arms project forwardly from the frame to a position over the end frame elements 13 so as to provide support for the reel extending the header above the cutter bar. Each arm is movable in its pivotal action by a suitable drive actuator 23.

The number of arms can vary in accordance with engineering requirements depending upon the width of the header. Some headers have only arms at the ends and some have additional arms intermediate the ends to provide the necessary support.

The reel further includes end support discs, one of which is shown only schematically in FIG. 1 as a circle at the end of the reel but it will be appreciated that the structural arrangement of the disc can vary in accordance with engineering requirements. The end disc is indicated at 24 and is mounted on a shaft 25 which supports the disc for rotation about an axis 26 of the reel.

The disc supports a plurality of reel bats 27 at angularly spaced positions around the axis 26. Each reel bar carries a plurality of longitudinally spaced fingers 28 which project outwardly from the bar for engaging the crop Each reel bat is pivotal about its own individual axis parallel to the axis 26 so as to change the angular position of the fingers around the axis 27A of the bat. The angular position of the bat about its axis is controlled by a linkage 29 of the bat which cooperates with a cam 30 of the reel so that as the bats rotate the linkage moves the bats to the required angular position in dependence upon the co-operation of the linkage with the cam.

Arrangements of this general type are well known and conventional as discussed in the prior art set forth above. The following description relates to the modifications and improvements set forth in the present application and refers to the details shown in FIG. 1 and the further drawings.

Figure 2:
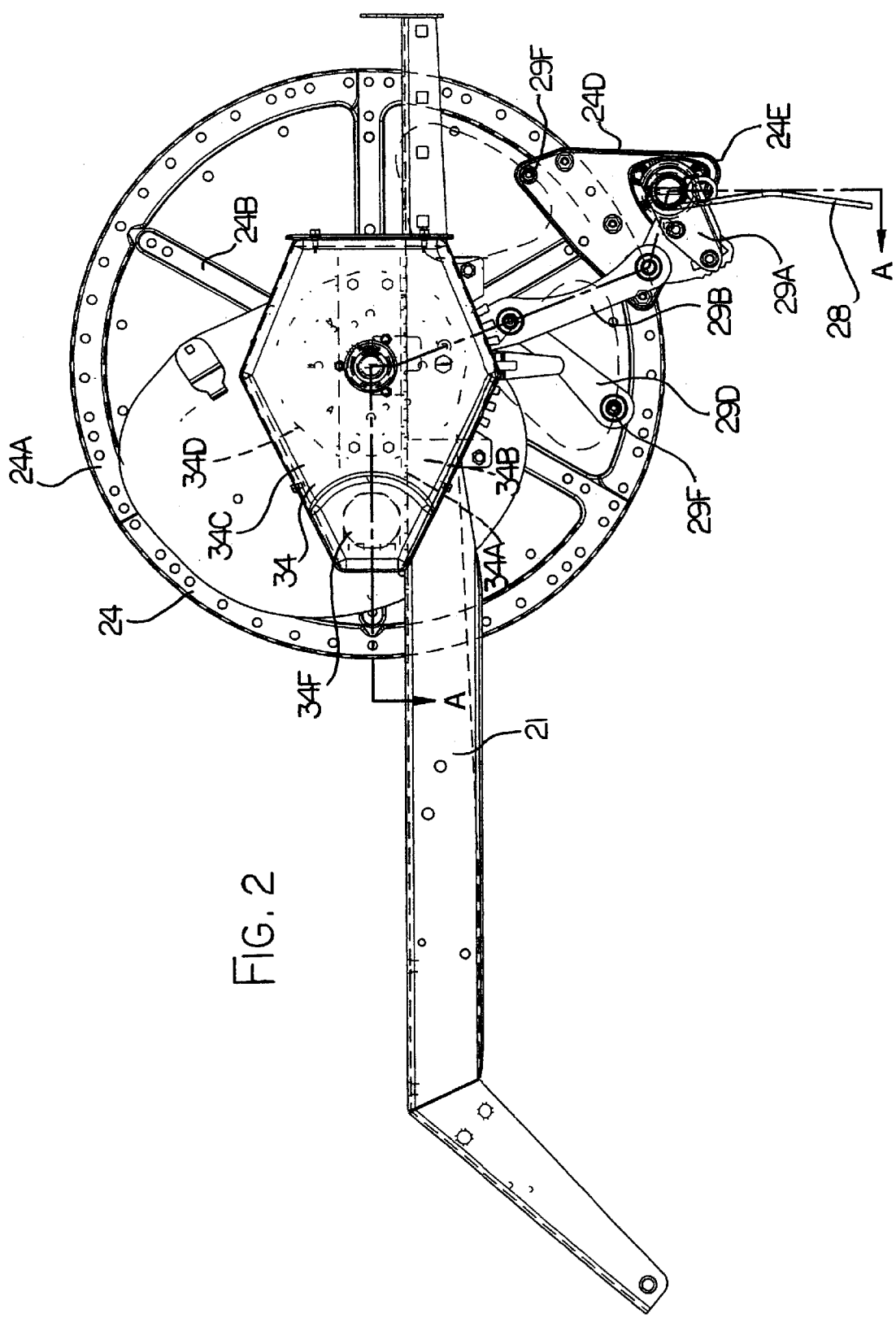
FIG. 2 is an end elevation of the reel of FIG. 1 looking from the opposite direction and showing only the components of the reel and reel support arms, with only one of the tine tubes and associated components shown for convenience of illustration.

The disc 24 as better shown in FIG. 2 comprises a peripheral ring 24A and a plurality of spokes 24B attached to a tube 24C which extends along the length of the reel and provides structural support therefore. The shaft 25 is suitably attached within the tube as a stub shaft portion projecting from one end of the tube for mounting of the reel structure on bearings outboard of the reel and mounted on the arm 21 as discussed hereinafter.

The ring 24A carries a plurality of bat support brackets 24D at spaced positions around the axis of the reel with each bracket carrying a respective one of the bats 27 and its longitudinally spaced fingers 28. Each bracket is generally triangular in shape and fastened to the ring 24A at locations which provide suitable mounting therefore and may provide adjustment for the position of the bracket and the ring. The bracket extends generally outwardly to an apex 24E outboard of the ring 24A at which is attached a bearing assembly 24F for the bat 27. The bearing 24F defines a bearing axis 27A parallel to the axis 26. In the embodiment shown the bats are cylindrical tubes, otherwise known as a tine tube, on which is attached a plurality of the fingers 28 using conventional mounting methods. In the embodiment shown the fingers are of spring metal with a base mounting portion 28A attached on the outside of the tube and two conjoined fingers each having a coil spring 28B attached to the mounting portion 28A and extending outwardly from the bat in the required direction. Other arrangements of fingers and bats can be used and are well known to one skilled in the art which are not necessarily cylindrical and are not necessarily formed from spring metal but can be of other shapes and include plastic fingers and the like.

Figure 3:
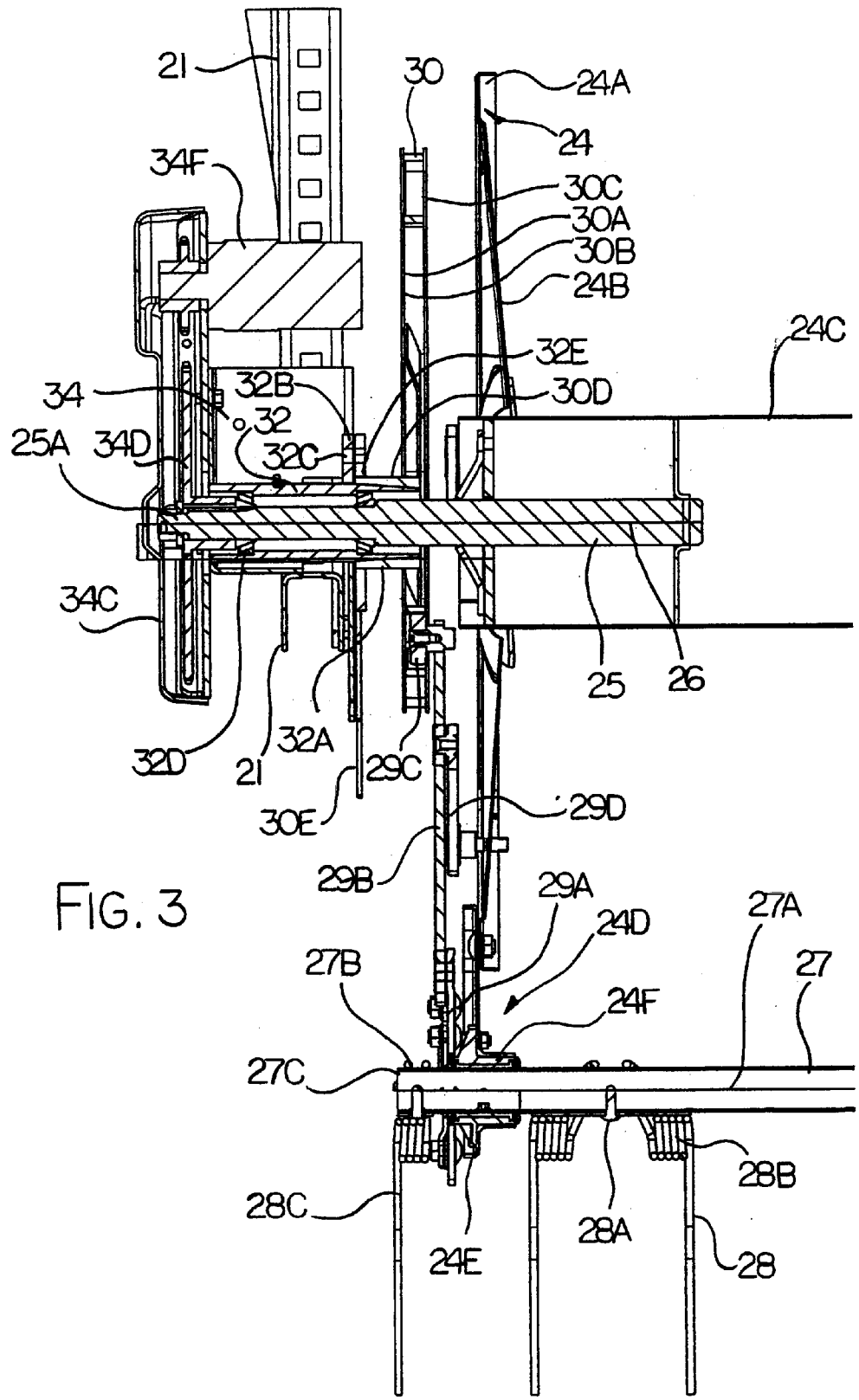
FIG. 3 is a cross sectional view along the lines A—A of FIG. 2.

Along the length of the bar is provided a series of the conjoined double fingers for which one of which is shown in FIG. 3. At the end of the bat is a stub portion 27B which projects through the bracket 24D and bearing 24F so as to project axially beyond the disc 24 and axially beyond the flat bracket 24D attached to the disc to an end face 27C of the bat which is thus located beyond the disc toward the end of the header. An additional single finger 28C is located on the stub portion 27B directly at the end 27C so that the finger 28C is located as far as possible along the bat towards its extreme end and particularly the end face 27C. In view of the relatively short length of the stub portion 27B, the finger 28C is formed as a single finger element rather than a double finger element conventionally used. However a longer stub portion could be provided making use of a conventional double finger construction.

The bats 27 lie on a circle 27D (FIG. 1) surrounding the axis 26 of the reel which defines a cylinder containing the axes 27A of the bats and is called hereinafter for convenience the "the bat circle". It will of course be appreciated that the "bat circle" is intended to relate not merely to a theoretical circle but to the volume swept by the bats as they rotate which of course must be open to allow the bats to rotate without interference without other components and particularly the cam 30.

The cam 30 comprises a base plate 30A which is flat and arranged to lie in a radial plane of the axis 26. On a face 30B of the plate is provided a cam track 30C which faces the reel and is defined by inner and outer cam track walls which provide a guide for a cam follower. The construction of the cam track is of a conventional nature and defines a continuous track surrounding the axis 26 and shaped to provide a required finger pattern as discussed hereinafter. A sleeve member 30D is rigidly attached to the outside surface of the plate 30A and projects therefrom axially along the axis 26. At the end of the sleeve member 30D is rigidly attached a mounting and adjustment plate 30E defining a ring portion 30F surrounding the axis and a lever portion 30G projecting outwardly from the axis and including a locating hole 30H. The ring portion includes mounting slots 30J.

The sleeve 30D engages around a mounting tube 32 at an end portion 32A of the tube. The tube 32 carries a flange 32B which butts against the mounting plate 30E when the sleeve 30D is inserted onto the end 32A of the tube 32. Holes 32C in the plate 32B align with the slots 30J and allow these plates to be clamped together thus tightly pulling the sleeve 30D onto the tube 32 in a clamping action. For this purpose the end portion 32A and the sleeve 30D are tapered so as to ensure accurate alignment of the axes of the tube and the sleeve and therefore an accurate alignment of the radial plane of the plate 30A of the cam with the axis of the tube 32.

The shaft 25 of the reel is mounted within the tube 32 on axially spaced bearings 32D and 32E so that the shaft projects through the tube 32 to an outer end 25A. Thus the shaft 25 is maintained by the axially spaced bearings 32D and 32E accurately axially in alignment with the tube 32 and therefore accurately with the plane of the cam 30 lying in the radial plane of the axis of the shaft 25.

The tube 32 is attached to a housing 34 which is mounted on the arm 21. The housing 34 includes a top plate 34A and a depending flange 34B attached to the tube 32 and sitting over the top of the channel defining the arm 21. The mounting assembly 34 further includes a housing 34C containing a drive sprocket 34D to which a suitable drive is applied with the sprocket keyed to the end 25A of the shaft 25. The housing 34C extends along the arm 21 to a support pin 34F which sits on top of the arm 21 and thus angularly orients the housing relative to the axis of the reel. The mounting assembly 34 can move longitudinally of the arm to adjust the forward to rear position of the reel on the arm using adjustment openings 21C in the arm as is known to one skilled in the art. The mounting assembly 34 is thus rigidly attached to the tube 32 but sits on the arm allowing some twisting movement between the mounting assembly and the arm so that the axis of the tube which is accurately aligned to the axis of the reel can twist relative to the arm to accommodate twisting movements in the frame during operation or twisting movements in the reel due to differential lifting forces or other forces on the reel during operation. However the accurate alignment of the reel axis with the axis of the tube 32 ensures that, whenever any such twisting movements occur, the twisting movements do not occur relative to the cam which is maintained in a radial plane.

In addition to the movement of the mounting assembly 34 along the arm, a further adjustment can be effected for the finger pattern and location by rotating the cam 30 about the axis of the reel. This is achieved by loosening the coupling between the plate 30E and the plate 32B and by rotating the lever portion 30G around the axis of the tube 32 within the bounds of the slots 30J. This allows the plates to be clamped back together in the fixed position after the adjustment is effected. During this adjustment the cam remains accurately in the required radial plane.

In an alternative arrangement (not shown) the housing 34 which carries a chain and sprocket backing plate 341 is rigidly mounted to the plate 30B of the cam track so that the tube 32 and the tube 30D are integral rather than formed as two separate relatively adjustable components. In order to adjust the finger pitch, the whole assembly including the housing 34, the backing plate 341, the integral tube and the cam plate 30B are then rotated relative to the reel arm 21. This requires the design, which is within the skill of one in the art, of a housing which is mounted on the reel arm in fixed position but which can be adjusted relative to the arm. However it avoids the potential point of weakness in the connection between the tube 32 and the tube 30D. In both cases, the cam plate is maintained accurately in a plane radial to the axis of the reel during use and during adjustment.

Figure 4:
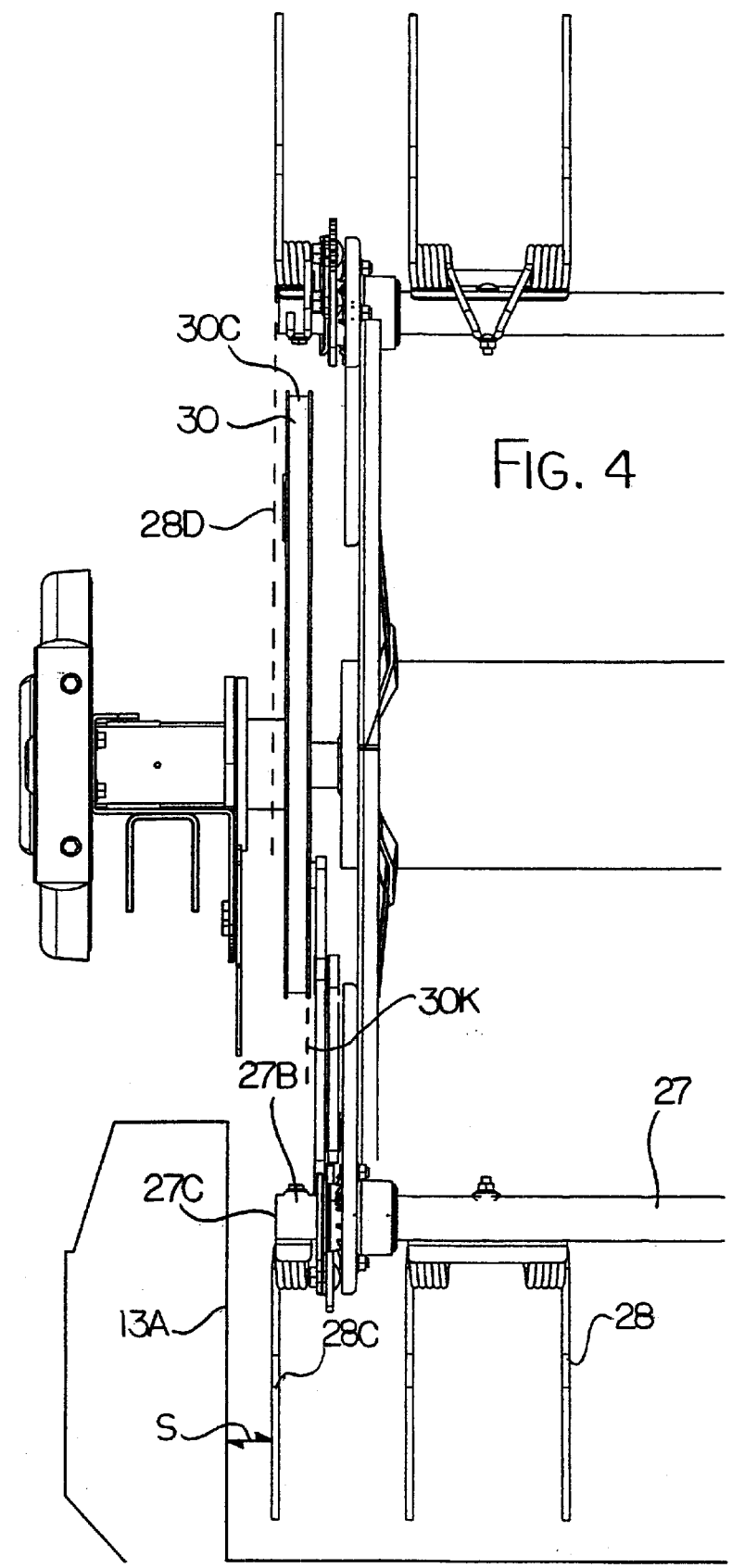
FIG. 4 is a front elevational view of the reel similar to that of FIG. 3 showing the inter-relation between the reel and the frame end sheet.
Figure 5:
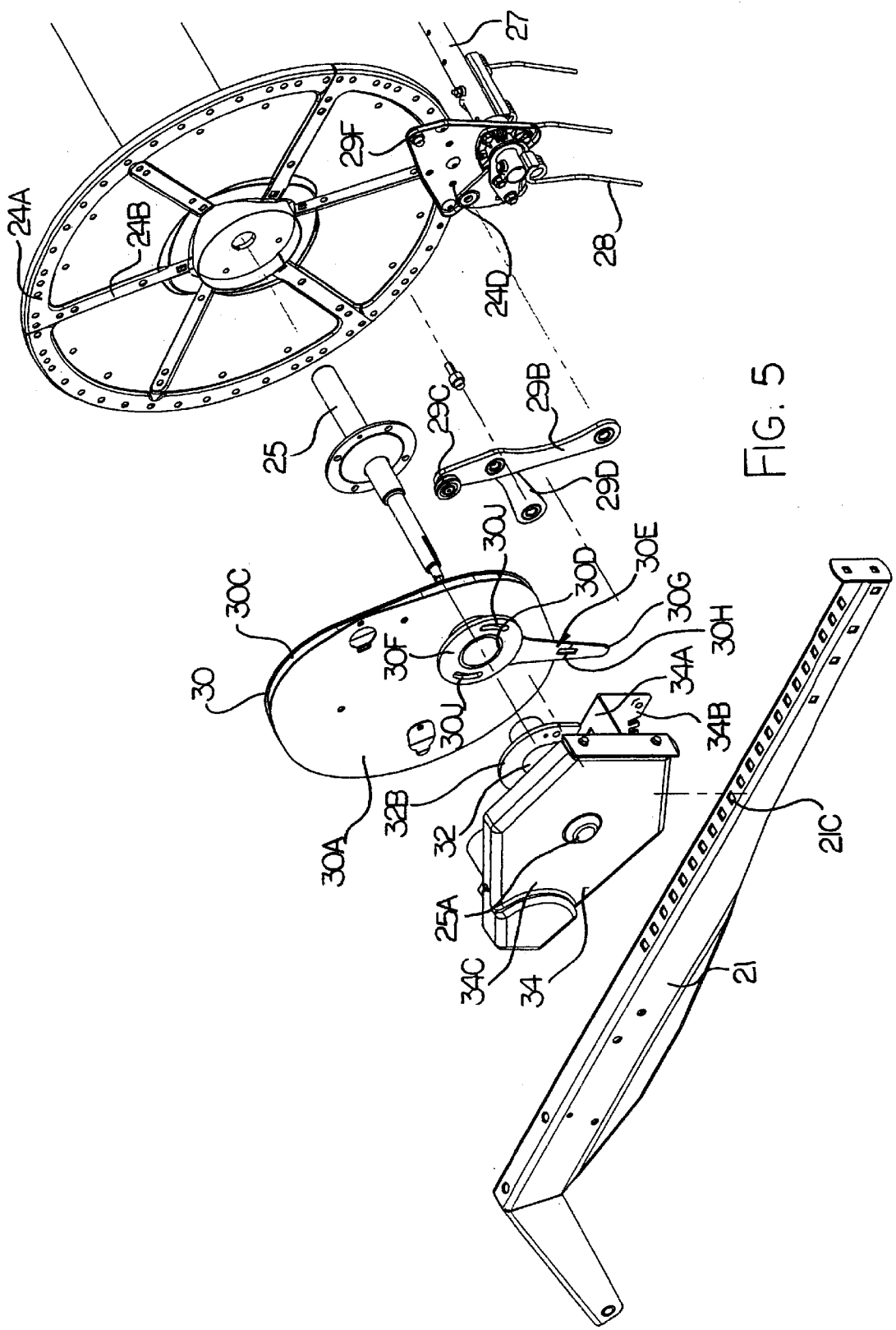
FIG. 5 is an exploded view of the reel and reel support arm of FIG. 2.

The cam 30 is shaped and arranged and dimensioned so that it lies wholly within the bat circle. Thus the outside periphery of the cam at the cam track 30C lies wholly within the path of movement of the bats and wholly within the structure defined by the bats 27 and the elements supported thereby so that the bats are located outside of the cam. Thus as shown in FIG. 4 the stub portion 27B carrying the finger 28C is aligned with the cam or slightly beyond the cam. Thus as shown a line 28D containing the end fingers 28C is slightly beyond the cam toward the end of the header of the header. This allows the fingers 28C to be located as close as possible to an end sheet 13A of the end frame section 13 to provide a sweeping action on the crop immediately adjacent that sheet. Thus the use of a small cam inside the bat circle allows these fingers to approach much more closely the end of the header and to avoid a space S between the end fingers 28C and the sheet 13A which is sufficient to allow crop to accumulate. This is achieved by the fact that the end face 27C is at least aligned with a line 30K at the inwardly facing end of the cam and more preferably is beyond that line.

In order to achieve this location and size of the cam, the cam cooperates with the control linkage 29 which co-operates between the bat and the cam track. The control linkage is shown schematically in FIG. 1 and comprises a crank 29A attached to the bat and rotatable at one end about the axis of the bat so as to rotate the bat about its axis as the angle of the crank is changed. The linkage further includes a control link 29B which is attached to the other end of the crank and extends therefrom to a cam follower 29C within the cam track 32C. The linkage further includes a guide link 29D which is connected between a suitable location on the reel and a pivot pin 29E on the control link so that the position on the control link is controlled.

For convenience the guide link 29D connects between the control link 29B and a pivot pin 29F on the next bracket 24D. However other connection points can be used provided that the pivot pin 29F is fixed relative to the reel and rotates with the reel so that the link 29D can pull the control link 29B around with the reel as the reel rotates to carry the follower 29C from FIG. 1 it will be noted that the cam follower is arranged angularly advanced relative to its respective bat axis so that the cam follower is pushed by the link 29B and guide link 29D around the cam track. This is opposite to the conventional arrangement where the cam follower is normally trailed. In order to keep the cam follower in advance of the radial line joining the axis 26 of the reel to the bat axis, the guide link 29D provides a pulling action from a position yet further angularly advanced. However pushing action from a trailing link could also be used.

The cam is shaped so that its spacing from the axis 26 changes as the cam follower rotates around the axis 26 with the reel. This change in radial distance from the axis 26 therefore of course provides a pushing action on the respective crank 29A so as to rotate each bat around its axis 27A.

The shape and arrangement of the cam is calculated so as to provide a required finger action of a generally conventional nature.

Figure 6:
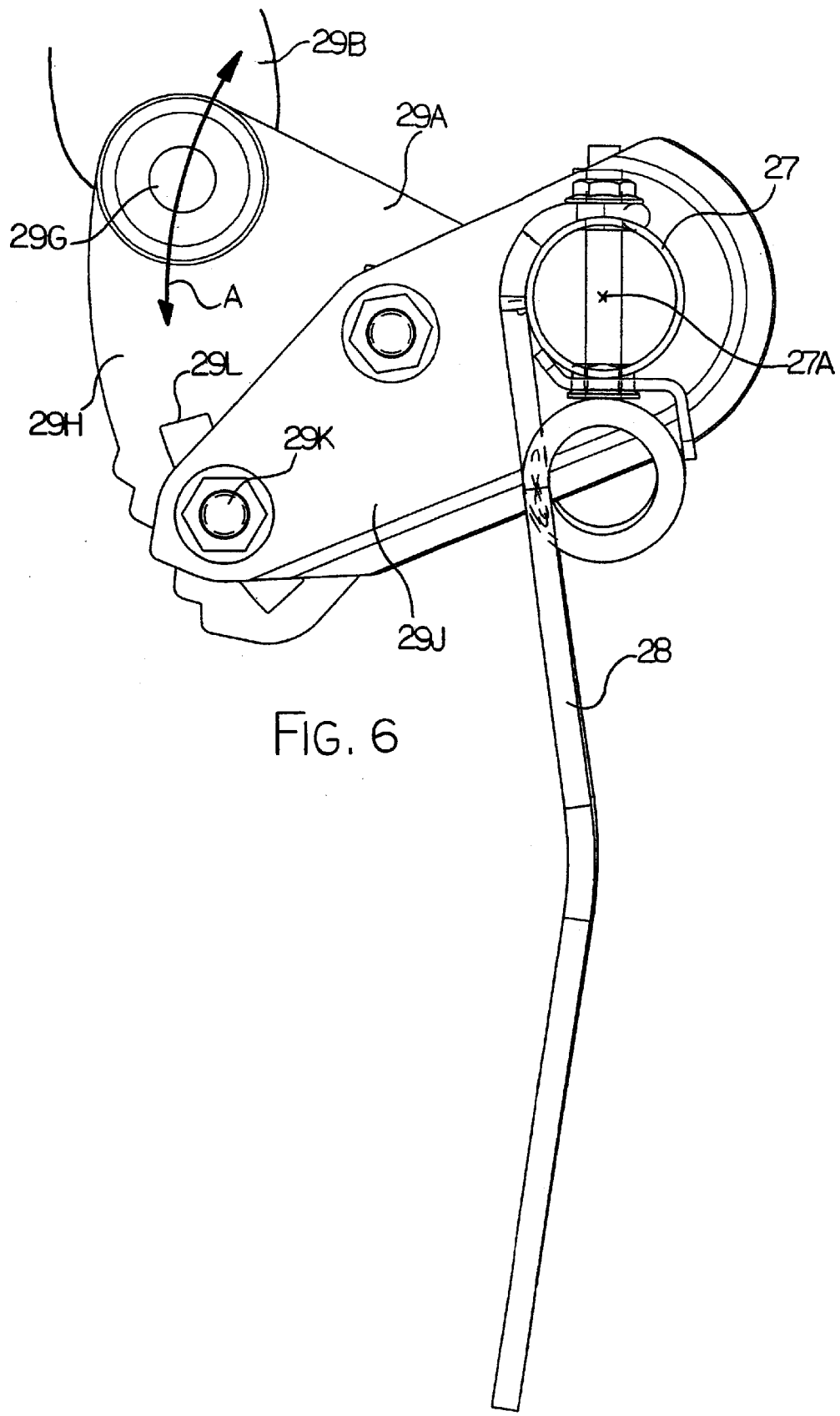
FIG. 6 is a view on an enlarged scale of one of the tine support tubes showing the connection of the control link and the crank which allows adjustment of the finger angle.

A yet further adjustment which can be provided is obtained by adjusting the angle of the fingers 28 around the axis 27A. For this purpose the crank 29A which is connected at a pin 29G to the control link 29B as shown in FIG. 6 is formed not as a simple lever but is instead formed as a two part side by side plate arrangement including a first plate portion 29H and a second plate portion 29J. These can be adjusted by bolts 29K and suitable guide slots 29L so that the location of the pivot pin 29G is adjusted around the axis 27A by adjusting the angle between the two plate portions. This of course as shown in FIG. 6 provides an adjustment A which causes the finger angle to change in relation to the position of the pivot pin 29G.

The finger pattern therefore can be adjusted as described above in three ways:

a) The location of the finger pattern can be moved forwardly and rearwardly along the arms.
b) The height of the arms can be changed.
c) The location of the finger pattern around the axis of the reel can be changed by adjusting the angular position of the cam.
d) The finger can be changed.

Some or all of these can be carried out manually or alternatively mechanical drive linkages can be provided so that the adjustment can be made on the go from the cab. Particularly the movement of the mounting assembly along the arm can be effected by a control linkage and also it may be desirable to provide a mechanical control linkage which adjust the angle of the cam. Adjustment of the finger angle is of course an independent adjustment for each bat and therefore may be less desirable to adjust automatically in view of the complexity involved.

The finger pattern is generally of a conventional nature and the outside path of the fingers is shown at P in FIG. 1 and the angle of the fingers is shown at a number of positions around the axis. In general the fingers are aggressively advanced in a position in front of the crop and in front of the cutter bar and then moved generally parallel as the fingers move rearwardly following which the fingers are retarded so that they are pulled generally vertically upwardly out of the crop.

A change of finger angle obtained by adjusting the link 29A provides the possibility of yet further increasing the aggressive action in front of the crop to provide a further lifting of the crop in a condition where the crop is downed.

A combination of the rotation of the cam and the location of the reel along the arms can move the pattern forwardly and rearwardly along the table while controlling the rearward most position that the fingers reach on the table before moving vertically upwardly. This adjustment may also be of assistance in auger type headers where it is desired to lift the fingers to clear away from the augers. It is also of assistance in both types of transport systems in providing a finger action which pushes the crop rearwardly over the table to prevent a dead space behind the reel in which crop can accumulate.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A crop harvesting header comprising:
   a header frame structure arranged for movement in a direction of working movement across ground carrying a crop to be harvested;
   a cutter bar arranged across a forward edge of the header frame structure for cutting the crop;
   a cut crop transport arrangement mounted on the header frame structure for receiving and transporting the cut crop for further processing;
   and a reel for controlling movement of the crop in the area over the cutter bar;
   the reel being mounted on the header frame structure for movement therewith in the direction of movement and for rotation about a reel axis generally parallel to the cutter bar;
   the reel having a plurality of reel bats at spaced positions around the reel axis each reel bat having reel fingers projecting generally radially outwardly from the reel axis, the reel bats all lying on a common bat circle around the reel axis so that rotation of the reel causes the reel bats to follow a path of movement lying on the bat circle;
   each of the reel bats being pivotal about its respective bat axis parallel to the reel axis so as to vary the angle of the fingers about the bat axis as the reel rotates;
   a cam member mounted on the header frame structure at one end of the reel defining a non-circular cam track surrounding the reel axis and lying in a radial plane of the reel axis, the cam track being held during rotation of the reel in stationary angular location relative to the reel axis and;
   each bat having associated therewith a respective control link with a cam follower on the control link which follows the cam track, such that, as the reel rotates through a series of angularly spaced positions of the bats, the movement of the follower on the cam track causes the respective control link to move relative to the respective bat axis to cause pivotal movement of the respective bat about the bat axis and thus, for each of the positions, to move the fingers of the bat around the bat axis to a required orientation relative to an axial plane of the reel axis passing through the bat axis;
   the cam track and the control links being arranged such that the cam track is located wholly radially inwardly of the bat circle;
   the bats at said one end of the reel extending longitudinally of the reel from an axial position spaced away from said one end toward said one end to a position such that an endmost finger of each of the bats lies in a radial plane of the reel axis which is at least in line with the cam track at said one end.

2. The header according to claim 1 wherein the radial plane of the endmost fingers is aligned with the cam.

3. The header according to claim 1 wherein the header frame structure includes an end sheet lying in a vertical plane at right angles to the cutter bar so as to lie along the direction of working movement and wherein the endmost fingers are arranged immediately adjacent the end sheet.

4. The header according to claim 1 wherein the reel is carried on at least two mounting arms of the header frame structure mounted on the header frame structure for upward and downward movement relative to the cutter bar, wherein the cam track is mounted with the reel for upward and downward movement with the mounting arms and wherein the cam track is mounted with the reel on the mounting arms so as to maintain the cam track accurately in a radial plane of the reel axis as the reel axis moves with the mounting arms.

5. The header according to claim 1 wherein each bat has associated therewith a crank attached to the bat and having an outer end spaced outwardly of the bat axis for effecting pivotal movement of the bat about the bat axis, wherein the respective control link of each bat has one end freely pivotally connected to the outer end of the crank and wherein each control link has associated therewith a respective link member for communicating rotation of the reel to the control link such that the cam follower thereof is caused to move along the cam track at a predetermined position therein.

6. The header according to claim 5 wherein the link member comprises a pivotal link which has one end pivotally connected to the reel at a fixed position thereon and a second end pivotally connected to the control link.

7. The header according to claim 6 wherein said one end is angularly advanced of the second end so that the link pulls the control link and the follower along the track.

8. The header according to claim 5 wherein the crank of each bat is adjustable relative to its associated control link to change the angle of the fingers of the bat around the bat axis, so as to adjust, for each of the positions, the respective orientation of said fingers relative to said axial plane.

9. The header according to claim 1 wherein each bat is adjustable relative to its associated control link to change the angle of the fingers of the bat around the bat axis, so as to adjust, for each of the positions, the respective orientation of said fingers relative to said axial plane.

10. The header according to claim 1 wherein the cam member is mounted for rotational adjustment movement of the stationary angular location thereof around the reel axis.

11. The header according to claim 10 wherein the reel is carried on at least two mounting arms of the header frame structure mounted on the header frame structure for upward and downward movement relative to the cutter bar, wherein the cam track is mounted with the reel for upward and downward movement with the mounting arms, wherein the cam track is mounted on a member fixed relative to the reel axis so as to maintain the cam track accurately in a radial plane of the reel axis as the reel axis moves with the mounting arms and wherein the cam track is mounted for rotational adjustment movement relative to the fixed member about the reel axis.

12. A crop harvesting header comprising:
   a header frame structure arranged for movement in a direction of working movement across ground carrying a crop to be harvested;
   a cutter bar arranged across a forward edge of the header frame structure for cutting the crop;
   a cut crop transport arrangement mounted on the header frame structure for receiving and transporting the cut crop for further processing;
   a reel for controlling movement of the crop in the area over the cutter bar;
   the reel being mounted on at least two mounting arms of the header frame structure for movement therewith in the direction of movement and for rotation about a reel axis generally parallel to the cutter bar, the mounting arms being mounted on the header frame structure for upward and downward movement relative to the cutter bar;
   the reel having a plurality of reel bats at spaced positions around the reel axis each reel bat having reel fingers projecting generally radially outwardly from the reel axis, the reel bats all lying on a common bat circle around the reel axis so that rotation of the reel causes the reel bats to follow a path of movement lying on the bat circle;
   each of the reel bats being pivotal about its respective bat axis parallel to the reel axis so as to vary the angle of the fingers about the bat axis as the reel rotates;
   a cam member defining a non-circular cam track surrounding the reel axis and lying in a radial plane of the reel axis;
   the cam member being held during rotation of the reel in stationary angular location relative to the reel axis;
   the cam member being mounted with the reel for upward and downward movement with the mounting arms;
   the cam member being mounted with the reel on the mounting arms so as to maintain the cam track accurately in a radial plane of the reel axis as the reel axis moves with the mounting arms;
   each bat having associated therewith a respective control link with a cam follower on the control link which follows the cam track, such that, as the reel rotates through a series of angularly spaced positions of the bats, the movement of the follower on the cam track causes the respective control link to move relative to the respective bat axis to cause pivotal movement of the respective bat about the bat axis and thus, for each of the positions, to move the fingers of the bat around the bat axis to a required orientation relative to an axial plane of the reel axis passing through the bat axis;
   the cam member being mounted for rotational adjustment movement of the stationary angular location thereof around the reel axis.

13. The header according to claim 12 wherein the reel includes at each end a reel support shaft portion lying on the reel axis for supporting the reel for rotation about the reel axis; wherein the cam member includes a reel support member defining a longitudinal support axis with bearings supporting one reel support shaft portion at one end of the reel such that the bearings hold and maintain the shaft portion and the reel axis accurately coaxially with the support axis; and wherein the cam member is arranged to hold and maintain the cam track accurately in a radial plane of the support axis so as to hold the cam track in a radial plane of the reel axis.

14. The header according to claim 13 wherein the reel support member comprises a tubular member surrounding the shaft portion.

15. The header according to claim 13 wherein the reel support member includes two axially spaced bearings for supporting the shaft portion at axially spaced positions thereon to hold the shaft portion accurately coaxial with the longitudinal axis.

16. The header according to claim 13 wherein the reel support member is mounted on a respective one of the arms in a manner so as to allow misalignment movements between the reel support member and the respective arm while maintaining the reel axis accurately coaxial with the longitudinal axis.

17. A crop harvesting header comprising:
   a header frame structure arranged for movement in a direction of working movement across ground carrying a crop to be harvested;
   a cutter bar arranged across a forward edge of the header frame structure for cutting the crop;
   a cut crop transport arrangement mounted on the header frame structure for receiving and transporting the cut crop for further processing;
   a reel for controlling movement of the crop in the area over the cutter bar;
   the reel having a plurality of reel bats at spaced positions around the reel axis each reel bat having reel fingers projecting generally radially outwardly from the reel axis, the reel bats all lying on a common bat circle around the reel axis so that rotation of the reel causes the reel bats to follow a path of movement lying on the bat circle;
   each of the reel bats being pivotal about its respective bat axis parallel to the reel axis so as to vary the angle of the fingers about the bat axis as the reel rotates;
   and a cam member defining a non-circular cam track surrounding the reel axis and lying in a radial plane of the reel axis;

each bat having associated therewith a respective control link with a cam follower on the control link which follows the cam track, such that, as the reel rotates through a series of angularly spaced positions of the bats, the movement of the follower on the cam track causes the respective control link to move relative to the respective bat axis to cause pivotal movement of the respective bat about the bat axis and thus, for each of the positions, to move the fingers of the bat around the bat axis to a required orientation relative to an axial plane of the reel axis passing through the bat axis;

the reel including at each end a reel support shaft portion lying on the reel axis for supporting the reel for rotation about the reel axis;

the cam member including a reel support member defining a longitudinal support axis with bearings supporting one reel support shaft portion at one end of the reel such that the bearings hold and maintain the shaft portion and the reel axis accurately coaxially with the support axis;

the cam member being arranged to hold and maintain the cam track accurately in a radial plane of the support axis so as to hold the cam track in a radial plane of the reel axis;

the cam member being mounted relative to the header frame structure so as to hold the cam track, during rotation of the reel, in stationary angular location relative to the reel axis;

and the cam member being mounted relative to the header frame structure for rotational adjustment movement of the stationary angular location thereof around the longitudinal axis and therefore the reel axis.

18. The header according to claim 17 wherein the reel support member comprises a tubular member surrounding the shaft portion.

19. The header according to claim 17 wherein the reel support member includes two axially spaced bearings for supporting the shaft portion at axially spaced positions thereon to hold the shaft portion accurately coaxial with the longitudinal axis.

20. The header according to claim 17 wherein the reel support member is mounted on the header frame structure in a manner so as to allow misalignment movements between the reel support member and the header frame structure while maintaining the reel axis accurately coaxial with the longitudinal axis.

21. A crop harvesting header comprising:

a header frame structure arranged for movement in a direction of working movement across ground carrying a crop to be harvested;

a cutter bar arranged across a forward edge of the header frame structure for cutting the crop;

a cut crop transport arrangement mounted on the header frame structure for receiving and transporting the cut crop for further processing;

a reel for controlling movement of the crop in the area over the cutter bar;

the reel having a plurality of reel bats at spaced positions around the reel axis each reel bat having reel fingers projecting generally radially outwardly from the reel axis, the reel bats all lying on a common bat circle around the reel axis so that rotation of the reel causes the reel bats to follow a path of movement lying on the bat circle;

each of the reel bats being pivotal about its respective bat axis parallel to the reel axis so as to vary the angle of the fingers about the bat axis as the reel rotates;

a cam member defining a non-circular cam track surrounding the reel axis and lying in a radial plane of the reel axis;

the cam track being held during rotation of the reel in stationary angular location relative to the reel axis;

each bat having associated therewith a respective control link with a cam follower on the control link which follows the cam track, such that, as the reel rotates through a series of angularly spaced positions of the bats, the movement of the follower on the cam track causes the respective control link to move relative to the respective bat axis to cause pivotal movement of the respective bat about the bat axis and thus, for each of the positions, to move the fingers of the bat around the bat axis to a required orientation relative to an axial plane of the reel axis passing through the bat axis;

each bat being adjustable relative to its associated control link to change the angle of the fingers of the bat around the bat axis, so as to adjust, for each of the positions, the respective orientation of said fingers relative to said axial plane.

22. The header according to claim 21 wherein the reel is carried on at least two mounting arms of the header frame structure mounted on the header frame structure for upward and downward movement relative to the cutter bar, wherein the cam track is mounted with the reel for upward and downward movement with the mounting arms and wherein the cam track is mounted with the reel on the mounting arms so as to maintain the cam track accurately in a radial plane of the reel axis as the reel axis moves with the mounting arms.

23. The header according to claim 21 wherein each bat has associated therewith a crank attached to the bat and having an outer end spaced outwardly of the bat axis for effecting pivotal movement of the bat about the bat axis, wherein the respective control link of each bat has one end freely pivotally connected to the outer end of the crank and wherein each control link has associated therewith a respective link member for communicating rotation of the reel to the control link such that the cam follower thereof is caused to move along the cam track at a predetermined position therein.

24. The header according to claim 23 wherein the link member comprises a pivotal link which has one end pivotally connected to the reel at a fixed position thereon and a second end pivotally connected to the control link.

25. The header according to claim 24 wherein said one end is angularly advanced of the second end so that the link pulls the control link and the follower along the track.

26. The header according to claim 23 wherein the crank of each bat is adjustable relative to its associated control link to change the angle of the fingers of the bat around the bat axis.

27. A crop harvesting header comprising:

a header frame structure arranged for movement in a direction of working movement across ground carrying a crop to be harvested;

a cutter bar arranged across a forward edge of the header frame structure for cutting the crop;

a cut crop transport arrangement mounted on the header frame structure for receiving and transporting the cut crop for further processing;

a reel for controlling movement of the crop in the area over the cutter bar;

the reel having a plurality of reel bats at spaced positions around the reel axis each reel bat having reel fingers projecting generally radially outwardly from the reel axis, the reel bats all lying on a common bat circle around the reel axis so that rotation of the reel causes the reel bats to follow a path of movement lying on the bat circle;

each of the reel bats being freely pivotal about its respective bat axis parallel to the reel axis so as to vary the angle of the fingers about the bat axis as the reel rotates;

a cam member defining a non-circular cam track surrounding the reel axis and lying in a radial plane of the reel axis;

the cam track being held, during rotation of the reel, in stationary angular location relative to the reel axis;

each bat having associated therewith a crank attached to the bat and having an outer end spaced outwardly of the bat axis for effecting pivotal movement of the bat about the bat axis;

each bat having associated therewith a respective control link having one end freely pivotally connected to the outer end of the crank and having a cam follower at a second end of the control link for following the cam track;

each control link having associated therewith a respective link member for communicating rotation of the reel to the control link such that the cam follower thereof is caused to move along the cam track at a predetermined position therein;

such that, as the reel rotates through a series of angularly spaced positions of the bats, the movement of the respective follower on the cam track causes the respective control link to move relative to the respective bat axis to cause pivotal movement of the respective crank and thus the respective bat about the bat axis and thus, for each of the positions, to move the fingers of the bat around the bat axis to a required orientation relative to an axial plane of the reel axis passing through the bat axis.

28. The header according to claim 27 wherein the link member comprises a pivotal link which has one end pivotally connected to the reel at a fixed position thereon and a second end pivotally connected to the control link.

29. The header according to claim 28 wherein said one end is angularly advanced of the second end so that the link pulls the control link and the follower along the track.

30. The header according to claim 27 wherein the cam track and the control links are arranged such that the cam track is located wholly radially inwardly of the bat circle.

* * * * *